United States Patent
Chen et al.

(10) Patent No.: US 10,820,696 B2
(45) Date of Patent: Nov. 3, 2020

(54) DRAWER PART ASSEMBLY AND MOUNTING FITTING THEREOF

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Fang-Cheng Su, Kaohsiung (TW); Shih-Lung Huang, Kaohsiung (TW); Ci-Bin Huang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 368 days.

(21) Appl. No.: 15/291,356

(22) Filed: Oct. 12, 2016

(65) Prior Publication Data

US 2017/0135472 A1    May 18, 2017

(30) Foreign Application Priority Data

Nov. 12, 2015  (TW) .............................. 104137461 A

(51) Int. Cl.
*A47B 88/427* (2017.01)
*A47B 88/483* (2017.01)
*A47B 88/90* (2017.01)
*F16B 12/50* (2006.01)
*A47B 88/57* (2017.01)

(52) U.S. Cl.
CPC .......... *A47B 88/427* (2017.01); *A47B 88/483* (2017.01); *A47B 88/57* (2017.01); *A47B 88/941* (2017.01); *F16B 12/50* (2013.01); *A47B 2088/4278* (2017.01); *A47B 2088/902* (2017.01)

(58) Field of Classification Search
CPC ............ A47B 88/941; A47B 2088/902; A47B 88/427; A47B 88/483; A47B 88/57; A47B 2088/4278; F16B 12/50
See application file for complete search history.

(56) References Cited

U.S. PATENT DOCUMENTS

| 1,648,591 | A | * | 11/1927 | Repay | ...................... | B65D 9/22 |
|---|---|---|---|---|---|---|
| | | | | | | 217/65 |
| 1,936,733 | A | * | 11/1933 | Richardson | ............. | F16B 12/46 |
| | | | | | | 217/65 |
| 5,358,326 | A | * | 10/1994 | Cherry | .................... | F25D 23/02 |
| | | | | | | 312/265.6 |

(Continued)

*Primary Examiner* — Daniel J Troy
*Assistant Examiner* — Ryan A Doyle
(74) *Attorney, Agent, or Firm* — Rosenberg, Klein & Lee

(57) ABSTRACT

A drawer part assembly includes first and second walls and a mounting fitting. The first wall includes a longitudinal section and a transverse section transversely connected to the longitudinal section. These two sections define a recess. The mounting fitting is attached to the first wall and includes first and second mounting portions, which are perpendicularly connected. The second mounting portion divides the first mounting portion into first and second portions. The second mounting portion is mounted in the recess. The longitudinal section of the first wall is allowed to press against the second portion of the first mounting portion. The second wall has an end portion mounted between the first portion and the second mounting portion of the mounting fitting.

10 Claims, 6 Drawing Sheets

(56) References Cited

U.S. PATENT DOCUMENTS

| | | | | |
|---|---|---|---|---|
| 5,588,730 | A | * 12/1996 | Rock | A47B 88/941 |
| | | | | 312/263 |
| 10,376,053 | B2 | * 8/2019 | Schallert | A47B 88/40 |
| 2008/0315740 | A1 | * 12/2008 | Lam | F16B 12/46 |
| | | | | 312/334.1 |
| 2012/0133259 | A1 | * 5/2012 | Babucke-Runte | A47B 88/941 |
| | | | | 312/330.1 |
| 2014/0015391 | A1 | * 1/2014 | Feuerstein | A47B 88/427 |
| | | | | 312/334.4 |
| 2014/0167586 | A1 | 6/2014 | Schallert | |
| 2017/0135475 | A1 | * 5/2017 | Chen | A47B 88/403 |

\* cited by examiner

DRAWER PART ASSEMBLY AND MOUNTING FITTING THEREOF

FIELD OF THE INVENTION

The present invention relates to furniture and more particularly to a drawer part assembly in which a mounting fitting serves to mount two walls together.

BACKGROUND OF THE INVENTION

Generally, a drawer includes a plurality of walls, which define a space for receiving objects. US Published Patent Application No. 2014/0167586 A1, for example, discloses a drawer including a drawer sidewall (10) and a drawer wall (11) mounted together by a fitting part (14). The mounting process begins by fixing the fitting part (14) to the drawer wall (11). Then, the drawer wall (11) is mounted in a recess (15) of the drawer sidewall (10) via the fitting part (14). While this published patent application, incorporated herein by reference, provides the fitting part (14) for mounting the drawer sidewall (10) and the drawer wall (11) together, the diversified designs of drawer wall structures on the market call for alternative products.

SUMMARY OF THE INVENTION

The present invention relates to a drawer part assembly in which a mounting fitting is configured to mount two walls in the drawer part assembly together.

According to one aspect of the invention, a drawer part assembly includes a first wall, a mounting fitting, and a second wall. The first wall defines a recess. The mounting fitting is attached to the first wall and includes a first mounting portion and a second mounting portion. The second mounting portion is substantially perpendicularly connected to the first mounting portion, divides the first mounting portion into a first portion and a second portion, and is mounted in the recess of the first wall. The second wall has an end portion mounted between the first portion of the first mounting portion of the mounting fitting and the second mounting portion of the mounting fitting. Preferably, the first wall includes a longitudinal section and a transverse section substantially transversely connected to the longitudinal section, the longitudinal section and the transverse section define the recess, and the longitudinal section of the first wall is allowed to press against the second portion of the first mounting portion.

According to another aspect of the present invention, a drawer applicable to be mounted in a cabinet is provided. The cabinet is provided with at least one slide assembly for carrying the drawer and allowing the drawer to be displaced with respect to the cabinet. The drawer includes a drawer part assembly, and the drawer part assembly includes a first wall, a mounting fitting, and a second wall. The first wall includes a longitudinal section and a transverse section substantially transversely connected to the longitudinal section. The longitudinal section and the transverse section define a recess. The mounting fitting is attached to the first wall and includes a first mounting portion and a second mounting portion. The second mounting portion is substantially perpendicularly connected to the first mounting portion, divides the first mounting portion into a first portion and a second portion, and is mounted in the recess of the first wall. The longitudinal section of the first wall is allowed to press against the second portion of the first mounting portion. The second wall has an end portion mounted between the first portion of the first mounting portion of the mounting fitting and the second mounting portion of the mounting fitting. Preferably, the at least one slide assembly includes a first rail, a second rail displaceable with respect to the first rail, and a carrier rail connected to the first wall. The carrier rail is provided with a notch and a stop wall adjacent to the notch. The second rail has a hanging portion configured to enter the notch and hang on the stop wall. The drawer further includes an extending section, which extends, and is bent, from the second mounting portion of the mounting fitting and is mounted between the hanging portion of the second rail and an outer wall portion of the first wall.

In some embodiments according to any one of the foregoing aspects, the first portion of the first mounting portion of the mounting fitting has at least one mounting feature, and the drawer part assembly further includes at least one connecting member arranged at the at least one mounting feature to connect with the second wall.

In some embodiments according to any one of the foregoing aspects, the first wall has an end portion, and the longitudinal section and the transverse section are adjacent to the end portion of the first wall.

In some embodiments according to any one of the foregoing aspects, the second portion of the first mounting portion of the mounting fitting has substantially the same width as the longitudinal section of the first wall.

In some embodiments according to any one of the foregoing aspects, the longitudinal section and the transverse section of the first wall substantially form an L shape.

According to yet another aspect of the present invention, a mounting fitting for mounting a first structural member and a second structural member together is provided. The first structural member includes a longitudinal section and a transverse section substantially transversely connected to the longitudinal section. The mounting fitting includes a first mounting portion and a second mounting portion. The second mounting portion is substantially perpendicularly connected to the first mounting portion, divides the first mounting portion into a first portion and a second portion, and is mounted to the first structural member. The longitudinal section of the first structural member is allowed to press against the second portion of the first mounting portion. The second structural member is mounted to the second mounting portion and the first portion of the first mounting portion. At least one connecting member connects the first portion of the first mounting portion to the second structural member.

One advantageous feature of the present invention is that the mounting fitting can be used to mount the two walls in the drawer part assembly together.

DETAILED DESCRIPTION OF THE INVENTION

Figure 1:
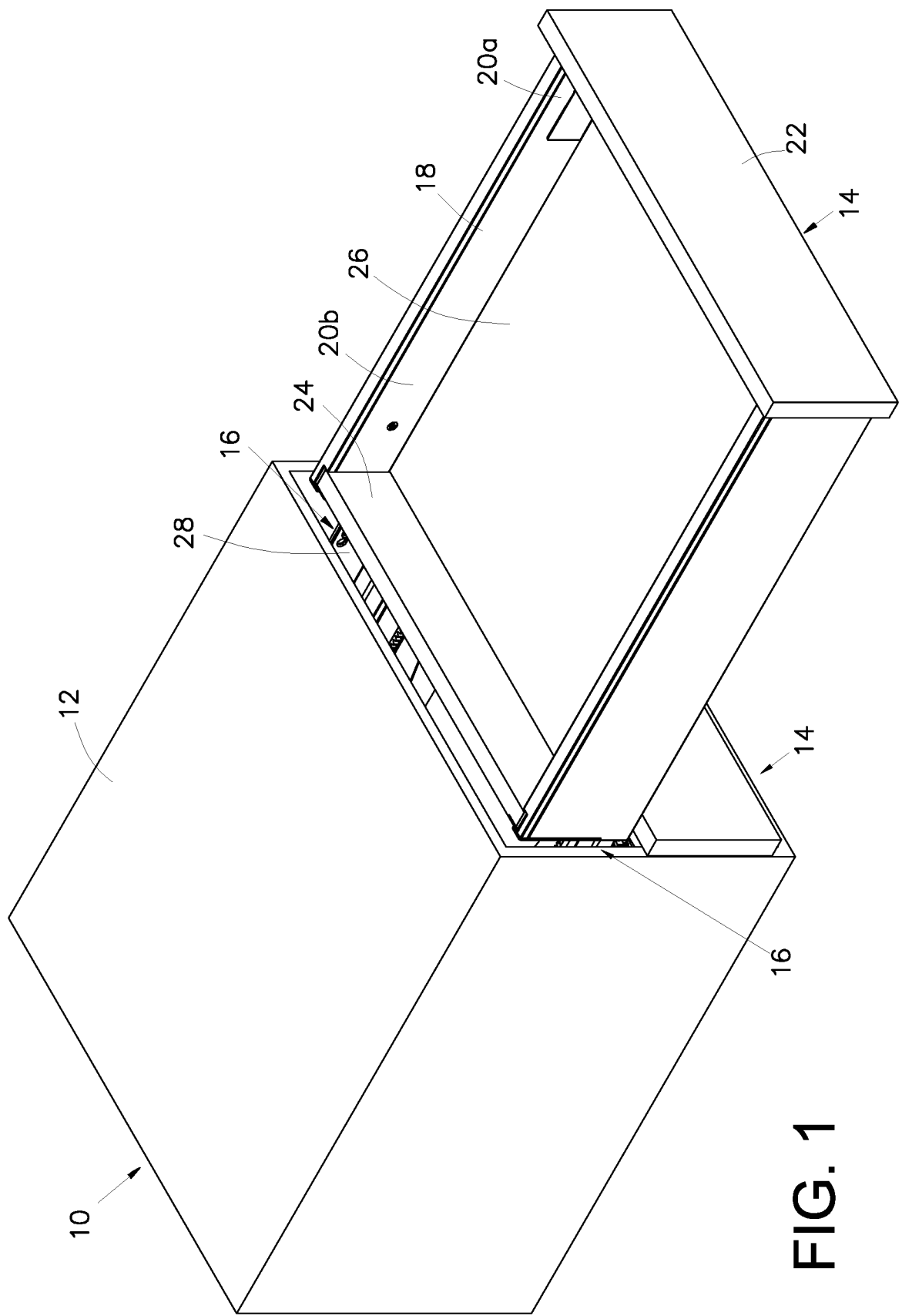
FIG. 1 is a perspective view of the system of an embodiment of the present invention, wherein the system includes a cabinet and at least one drawer displaceable with respect to the cabinet via a pair of slide assemblies.

Referring to FIG. 1, the system 10 according to an embodiment of the present invention includes a cabinet 12, at least one drawer 14, and at least one pair of slide assemblies 16. The system 10 may be a piece of furniture or any system into which a cabinet is incorporated. In this embodiment, the system 10 includes two drawers 14 and two pairs of slide assemblies 16 by way of example. For the sake of simplicity, only one of the drawers 14 and the corresponding pair of slide assemblies 16 are described herein. As shown in the drawing, the drawer 14 is mounted to the cabinet 12 via two slide assemblies 16. The slide assemblies 16 in this embodiment are undermount drawer slides. More specifically, the two slide assemblies 16 are mounted on two lateral bottom portions of the drawer 14 respectively so that the drawer 14 can be easily pulled out of and pushed back into the cabinet 12 via the pair of slide assemblies 16. The drawer 14 includes a pair of sidewalls 18. Each sidewall 18 has a front end portion 20a and a rear end portion 20b. The front end portions 20a of the two sidewalls 18 are connected to a front panel 22 while the rear end portions 20b of the two sidewalls 18 are connected to a rear panel 24. Each slide assembly 16 includes a first rail 28 fixedly mounted to the cabinet 12.

Figure 3:
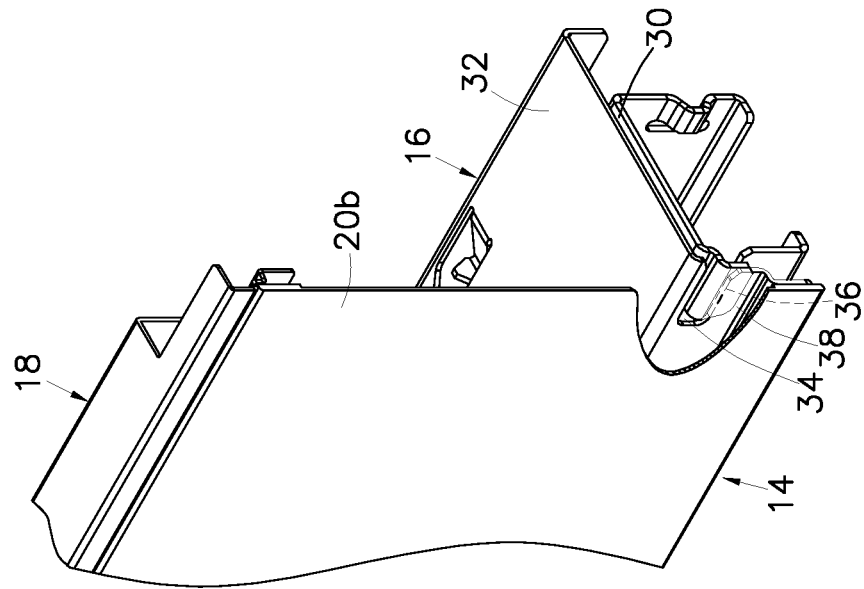
FIG. 3 is a perspective view showing how the hanging portion of the second rail in FIG. 2 enters the notch of the carrier rail and hangs on a stop wall.
Figure 2:
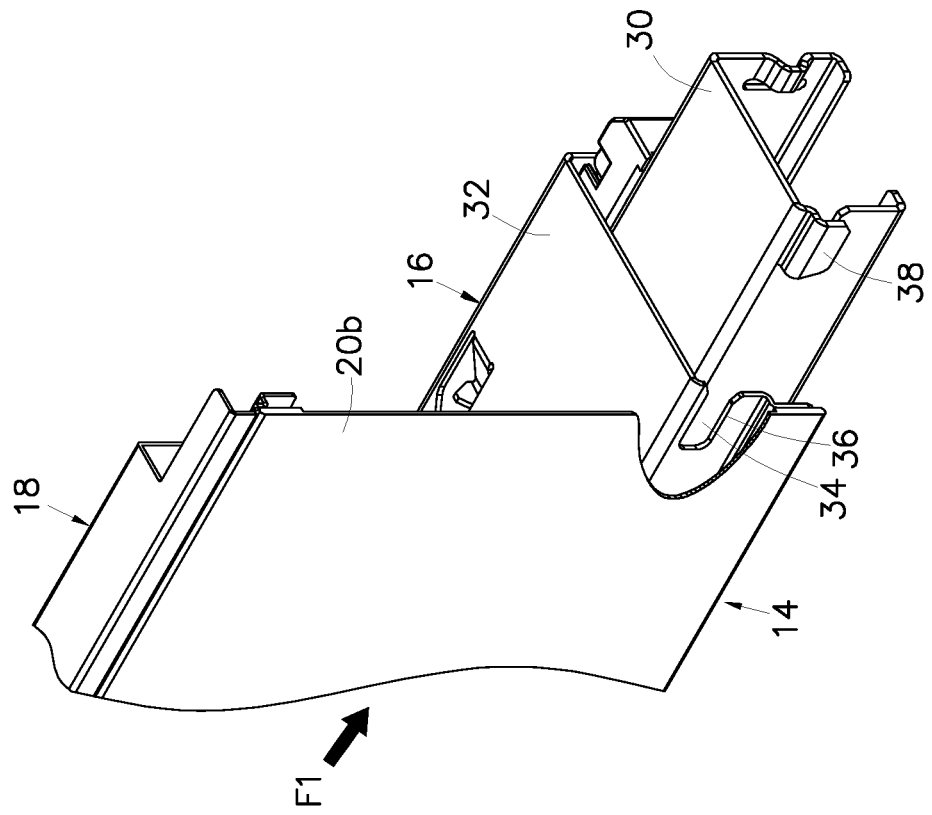
FIG. 2 is a perspective view showing how a sidewall of a drawer in FIG. 1 is connected to a carrier rail, wherein the carrier rail has a notch corresponding to a hanging portion of the corresponding second rail.

As shown in FIG. 2 and FIG. 3, each slide assembly 16 further includes a second rail 30 that can be displaced with respect to the first rail 28 thereof. In a preferred embodiment, each slide assembly 16 additionally includes a carrier rail 32 fixedly connected to the corresponding sidewall 18 of the drawer 14. More specifically, the front end portion 20a of the sidewall 18 is connected to the second rail 30 through the carrier rail 32 by a quick-release structure (not shown) for example. The carrier rail 32 is provided with a notch 34 and a stop wall 36, both adjacent to the rear end portion 20b of the sidewall 18. The stop wall 36 is adjacent to a lower edge of the notch 34. The second rail 30 has a hanging portion 38 corresponding to the notch 34. When subjected to an external force F1, the hanging portion 38 of the second rail 30 enters the notch 34 and hangs on the stop wall 36 (as shown in FIG. 3).

Figure 4:
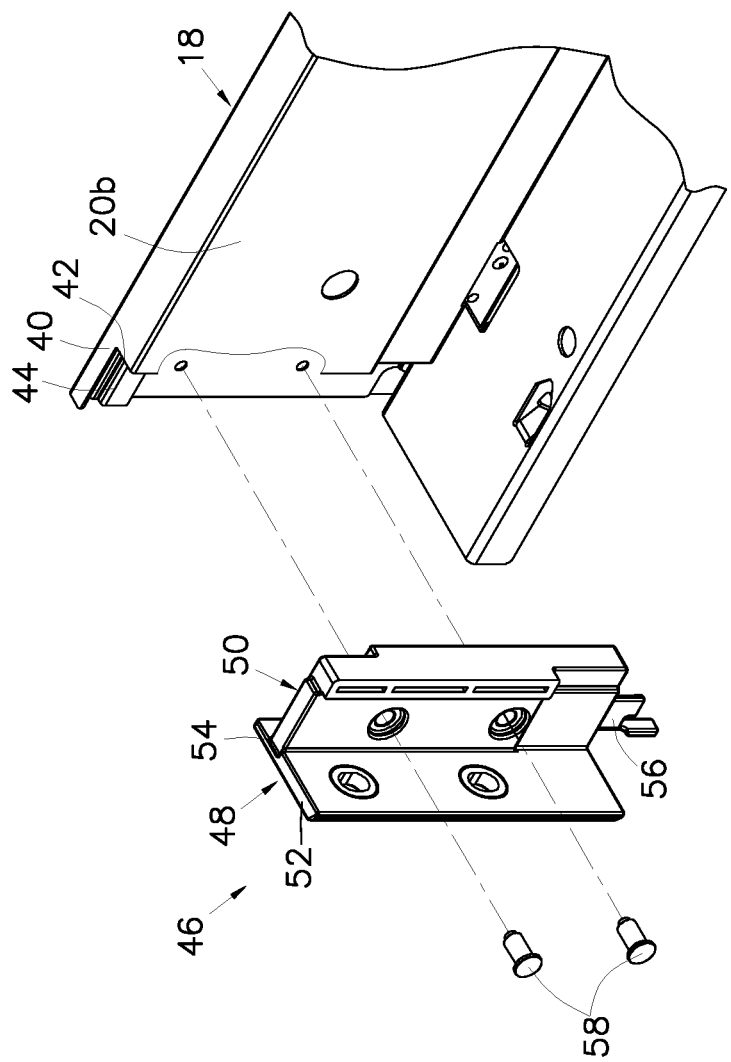
FIG. 4 is an exploded perspective view showing how a mounting fitting in the embodiment of FIG. 1 is mounted to a sidewall of a drawer.

Referring to FIG. 4, the rear end portion 20b of the sidewall 18 of the drawer 14 includes a longitudinal section 40 and a transverse section 42 connected to the longitudinal section 40. More specifically, the longitudinal section 40 and the transverse section 42 substantially form an L shape and jointly define a recess 44. A mounting fitting 46, which can be mounted to the sidewall 18 beforehand, includes a first mounting portion 48 and a second mounting portion 50 substantially perpendicularly connected to the first mounting portion 48. The second mounting portion 50 divides the first mounting portion 48 into a first portion 52 and a second portion 54. Preferably, the mounting fitting 46 further includes an extending section 56 extending from the second mounting portion 50. The mounting fitting 46 can be fixedly connected to the rear end portion 20b of the sidewall 18 via at least one fixing member 58 in advance.

Figure 5:
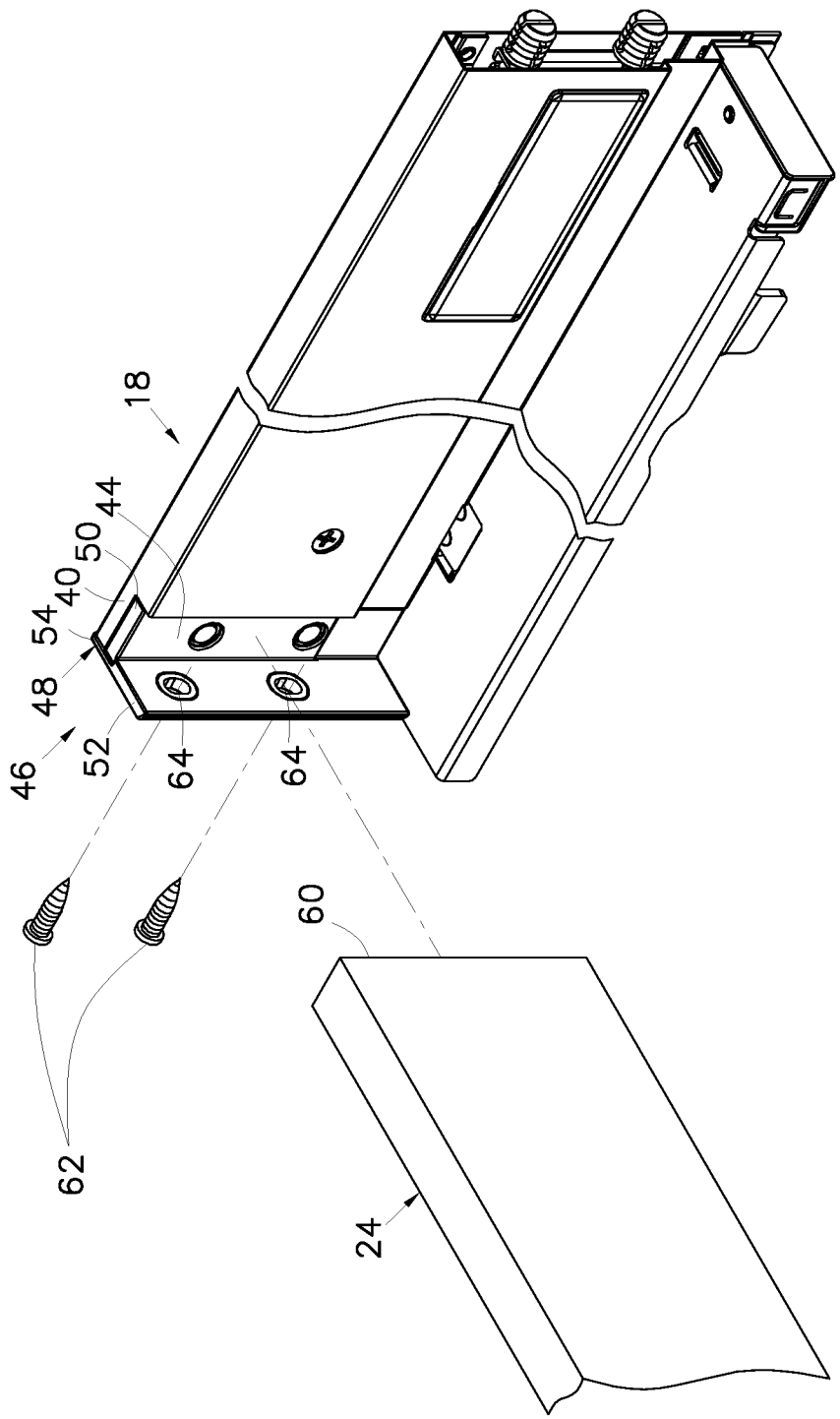
FIG. 5 is an exploded perspective view in which the mounting fitting in FIG. 4 is mounted to the sidewall of the drawer so that a rear panel can be mounted to the mounting fitting via at least one connecting member.

As shown in FIG. 5, once the mounting fitting 46 is fixedly connected to the sidewall 18, the second mounting portion 50 corresponds to and is mounted in the recess 44 of the sidewall 18, and the longitudinal section 40 of the sidewall 18 is allowed to press against the second portion 54 of the first mounting portion 48 of the mounting fitting 46. The rear panel 24 can then be mounted to the sidewall 18 via the mounting fitting 46. More specifically, the rear panel 24 has an end portion 60 to be mounted in the corner formed by the first portion 52 of the first mounting portion 48 and the second mounting portion 50. Preferably, at least one connecting member 62 is arranged at the at least one mounting feature 64 of the first portion 52 in order to connect with the rear panel 24.

Figure 6:
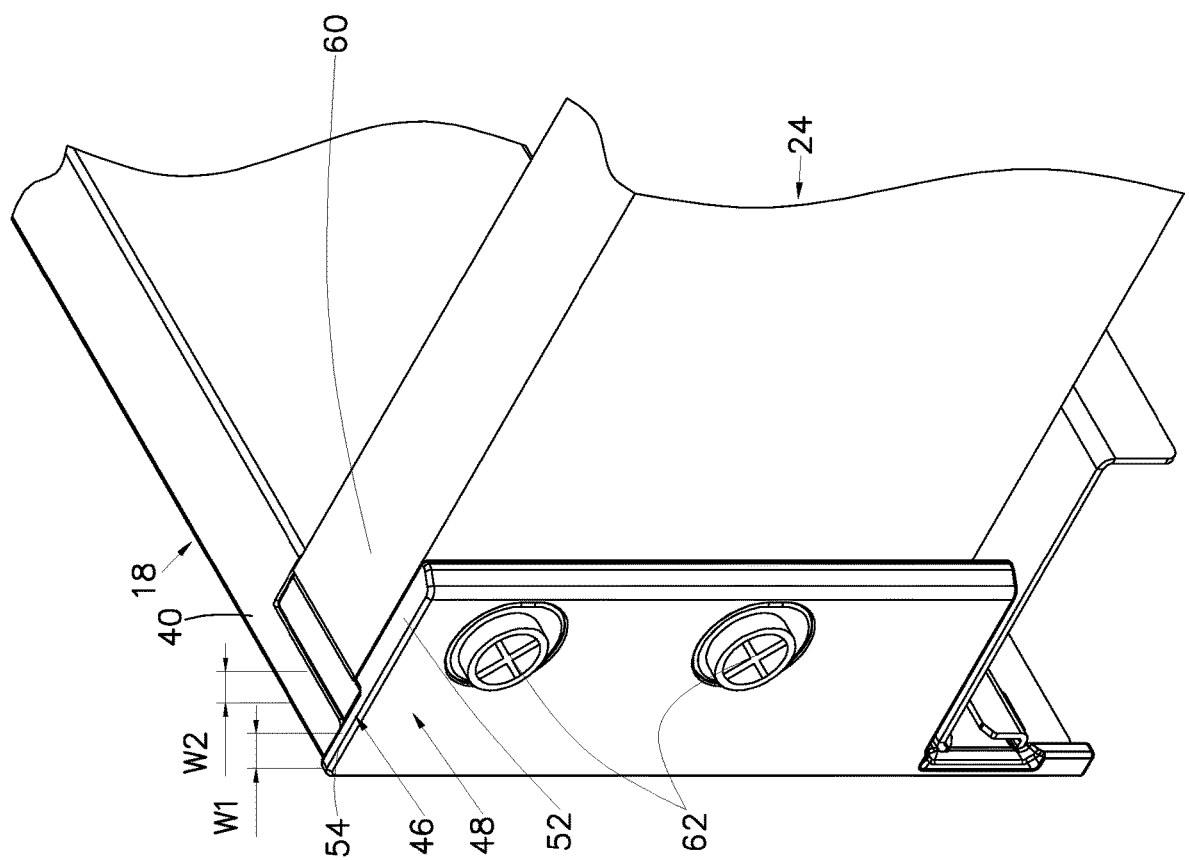
FIG. 6 is a perspective view in which the sidewall and the rear panel in FIG. 5 are mounted together via the mounting fitting.

As shown in FIG. 6, the at least one connecting member 62 is passed through the first portion 52 of the first mounting portion 48 to connect with the rear panel 24 and thereby mount the end portion 60 of the rear panel 24 securely to the mounting fitting 46. Furthermore, the second portion 54 of the mounting fitting 46 has a width W1 substantially equal to a width W2 of the longitudinal section 40 of the sidewall 18. This technical feature enables the mounting fitting 46 to better match the longitudinal section 40 of the sidewall 18 when mounted to the sidewall 18.

Figure 7:
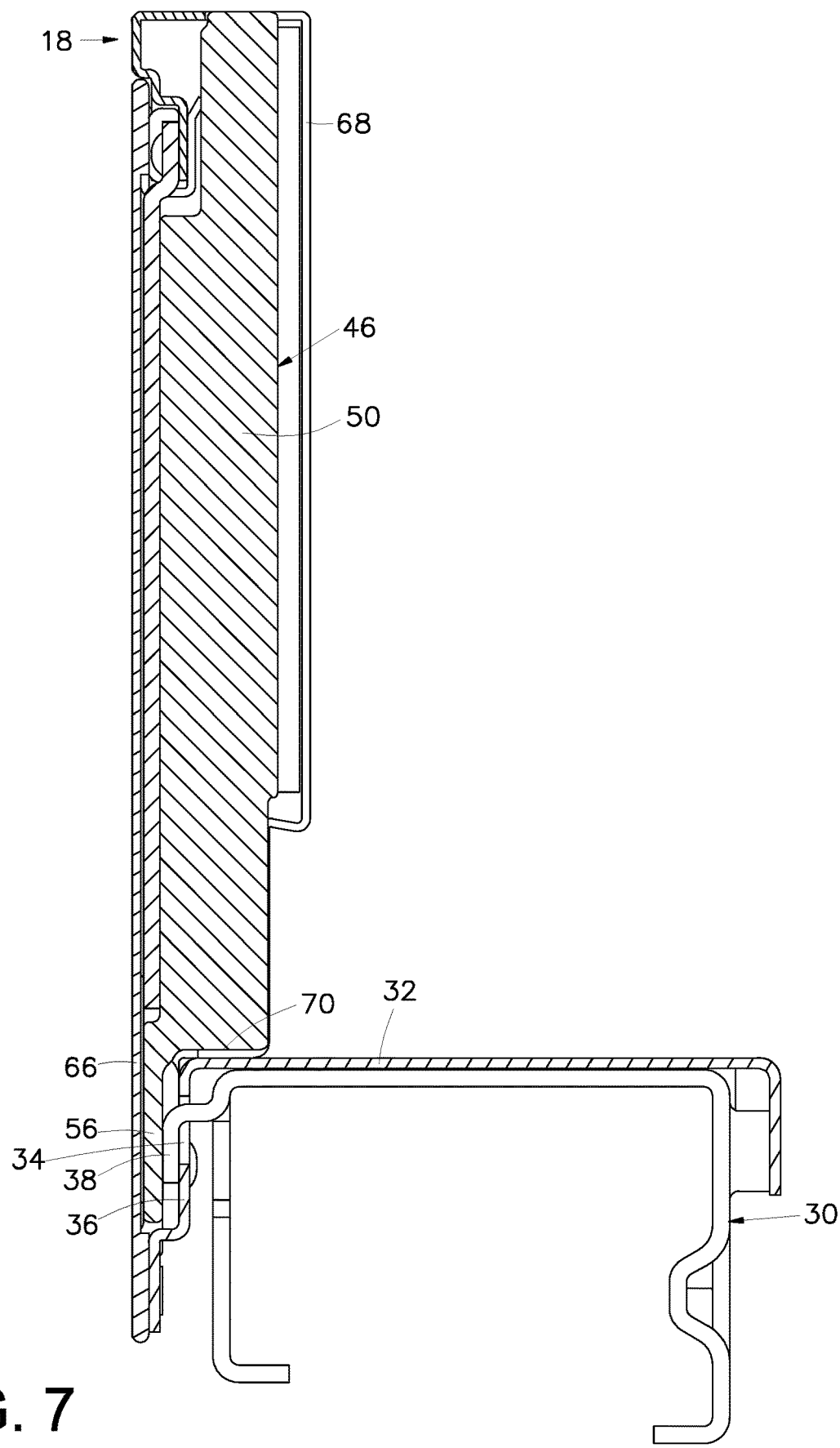
FIG. 7 schematically shows how the extending section of the mounting fitting in FIG. 4 is mounted between the hanging portion of the corresponding second rail and the sidewall of the drawer.

As shown in FIG. 7, the sidewall 18 of the drawer 14 includes an outer wall portion 66 and an inner wall portion 68 opposite the inner wall portion 66. The carrier rail 32 is fixedly connected to the sidewall 18 of the drawer 14. For example, the carrier rail 32 is fixedly connected to the outer wall portion 66 of the sidewall 18. The hanging portion 38 of the second rail 30 can enter the notch 34 of the carrier rail 32 and thereby hang on the stop wall 36. The extending section 56 of the mounting fitting 46 extends, and is bent, from a bottom portion 70 of the second mounting portion 50 and is configured to be mounted between the hanging portion 38 and the outer wall portion 66 to eliminate the gap between the hanging portion 38 and the outer wall portion 66.

While the present invention has been disclosed through the preferred embodiment described above, it is understood that the embodiment is not intended to be restrictive of the scope of the invention. Rather, the scope of patent protection sought by the applicant is defined by the appended claims.

What is claimed is:

1. A drawer part assembly, comprising:
a first wall defining a recess;
a mounting fitting attached to the first wall, the mounting fitting including an integrally formed first mounting portion, and a second mounting portion substantially perpendicularly connected to the first mounting portion to define an intermediate divider therefor, the second mounting portion dividing the first mounting portion intermediately therealong into first and second portions, at least one mounting feature being integrally formed in the first portion of the first mounting portion of the mounting fitting, wherein the second mounting portion is mounted against the first wall within the recess of the first wall with the second portion of the first mounting portion extending over an outer end of the first wall; and a second wall having an end portion mounted between the first portion of the first mounting portion of the mounting fitting and the second mounting portion of the mounting fitting, with the first portion of the first mounting portion extending over an outer surface of the end portion of the second wall, and at least one connecting member being arranged at the at least one mounting feature of the first portion of the first mounting portion to connect with the second wall, wherein at least a part of the end portion of the second wall is mounted between the first wall and the first portion of the first mounting portion of the mounting fitting.

2. The drawer part assembly of claim 1, wherein:
the first wall includes a longitudinal section extending a length of the first wall, and a transverse section transversely connected to the longitudinal section along a major portion of a length of the longitudinal section,
the longitudinal section and the transverse section jointly define the recess, and
the longitudinal section of the first wall is thereby allowed to press against the second portion of the first mounting portion.

3. The drawer part assembly of claim 2, wherein the second portion of the first mounting portion of the mounting fitting has a width substantially equal to a width of the longitudinal section of the first wall.

4. The drawer part assembly of claim 2, wherein the longitudinal section and the transverse section of the first wall form a substantially L shaped periphery of the recess.

5. The drawer part assembly of claim 2, wherein the at least a part of the end portion of the second wall is mounted between the transverse section of the first wall and the first portion of the first mounting portion of the mounting fitting.

6. A drawer applicable to be mounted in a cabinet, wherein the drawer is configured to be carried by at least one slide assembly of the cabinet and thereby displaceable with respect to the cabinet, the drawer comprising a drawer part assembly, in which the drawer part assembly includes:
a first wall including a longitudinal section extending a length of the first wall, and a transverse section substantially connected to the longitudinal section along a major portion of a length of the longitudinal section, the longitudinal section and the transverse section jointly defining a recess;
a mounting fitting attached to the first wall, the mounting fitting including an integrally formed first mounting portion, and a second mounting portion substantially perpendicularly connected to the first mounting portion to define an intermediate divider therefor, the second mounting portion dividing the first mounting portion intermediately therealong into first and second portions, at least one mounting feature being integrally formed in the first portion of the first mounting portion of the mounting fitting, wherein the second mounting portion is mounted in the recess of the first wall with the second portion of the first mounting portion extending over an outer end of the first wall, wherein the longitudinal section of the first wall presses against the second portion of the first mounting portion; and
a second wall having an end portion mounted between the first portion of the first mounting portion of the mounting fitting and the second mounting portion of the mounting fitting, with the first portion of the first mounting portion extending over an outer surface of the end portion of the second wall, and at least one connecting member being arranged at the at least one mounting feature of the first portion of the first mounting portion to connect with the second wall, wherein at least a part of the end portion of the second wall is mounted between the transverse section of the first wall and the first portion of the first mounting portion of the mounting fitting.

7. The drawer of claim 6, further comprising an extending section extending, and bent, from the second mounting portion of the mounting fitting, wherein the first wall of the drawer part assembly is connectable to a carrier rail of the at least one slide assembly and when a sliding rail of the at least one slide assembly hangs on a stop wall of the carrier rail via a hanging portion, the extending section is mountable between the hanging portion of the sliding rail and an outer wall portion of the first wall.

8. A mounting fitting for mounting a first structural member and a second structural member together, wherein the first structural member includes a longitudinal section extending a length of the first structural member, and a transverse section transversely connected to the longitudinal section along a major portion of a length of the longitudinal section, the mounting fitting comprising:
an integrally formed first mounting portion; and
a second mounting portion substantially perpendicularly connected to the first mounting portion to define an intermediate divider therefor, the second mounting portion dividing the first mounting portion intermediately therealong into first and second portions;
wherein at least one mounting feature is integrally formed in the first portion of the first mounting portion, and is configured to receive at least one connecting member to connect with the second structural member;
wherein the first structural member is mountable to the second mounting portion with the second portion of the first mounting portion extending over an outer end of the first structural member, and the longitudinal section of the first structural member is thereby allowed to press against the second portion of the first mounting portion;
wherein the second structural member is mountable to the second mounting portion and the first portion of the first mounting portion, with the first portion of the first mounting portion extending over an outer surface of an end portion of the second structural member, the first portion of the first mounting portion being connectable to the second structural member by the at least one connecting member; and
wherein at least a part of the end portion of the second structural member is mountable between the transverse section of the first structural member and the first portion of the first mounting portion of the mounting fitting.

9. The mounting fitting of claim 8, wherein the second mounting portion is mountable to the first structural member via at least one fixing member.

10. The mounting fitting of claim 8, wherein the second portion of the first mounting portion has a width substantially equal to a width of the longitudinal section of the first structural member.

* * * * *